(12) United States Patent  
Sovela et al.

(10) Patent No.: US 8,464,039 B2  
(45) Date of Patent: Jun. 11, 2013

(54) CIRCUITRY FOR PREVENTING GENERATION OF A HARDWARE RESET OUTPUT SIGNAL BY DISCHARGING A CAPACITOR UNDER THE CONTROL OF A CONTROL SIGNAL GENERATED BY SOFTWARE DURING ITS NORMAL OPERATION

(75) Inventors: Janne Antero Sovela, Turku (FI); Juhani Valdemar Kari, Lieto (FI)

(73) Assignee: Nokia Corporation, Espoo (FI)

( * ) Notice: Subject to any disclaimer, the term of this patent is extended or adjusted under 35 U.S.C. 154(b) by 113 days.

(21) Appl. No.: 12/750,879

(22) Filed: Mar. 31, 2010

(65) Prior Publication Data

US 2010/0257348 A1 Oct. 7, 2010

(30) Foreign Application Priority Data

Apr. 3, 2009 (GB) .................................. 0905800.9

(51) Int. Cl.  
*G06F 9/00* (2006.01)  
*G06F 15/177* (2006.01)

(52) U.S. Cl.  
USPC .................................. 713/2; 714/10; 714/23

(58) Field of Classification Search  
USPC .................................. 713/2; 714/100, 10, 23  
See application file for complete search history.

(56) References Cited

U.S. PATENT DOCUMENTS

| | | | |
|---|---|---|---|
| 4,696,002 A | 9/1987 | Schleupen et al. | 371/12 |
| 4,879,647 A | 11/1989 | Yazawa | 364/200 |
| 5,070,295 A | 12/1991 | Morigami | 323/314 |
| 5,123,018 A | 6/1992 | Peterson | 371/16.3 |
| 5,655,083 A | 8/1997 | Bagley | 395/182.31 |
| 5,983,330 A | 11/1999 | Miwa et al. | 711/167 |
| 6,463,546 B1 | 10/2002 | Jeske et al. | 713/400 |
| 2006/0083059 A1 | 4/2006 | Matsuura | 365/185.01 |
| 2008/0036468 A1* | 2/2008 | Alperin et al. | 324/538 |
| 2009/0075600 A1 | 3/2009 | Sanders et al. | 455/68 |

FOREIGN PATENT DOCUMENTS

| | | |
|---|---|---|
| EP | 1 090 460 B1 | 8/1986 |
| EP | 0 205 163 A2 | 12/1986 |
| EP | 1 727 049 A2 | 11/2006 |
| JP | 2008234484 A | 2/2008 |
| KR | 20040041385 A | 5/2004 |
| WO | WO 98/05126 | 2/1998 |
| WO | WO 99/67881 | 12/1999 |

* cited by examiner

*Primary Examiner* — Thomas Lee  
*Assistant Examiner* — Xuxing Chen  
(74) *Attorney, Agent, or Firm* — Harrington & Smith

(57) ABSTRACT

Hardware reset circuitry including user interface circuitry having at least a first state and a second state and configured, when in the first state, to prevent generation of a hardware reset output signal.

21 Claims, 5 Drawing Sheets

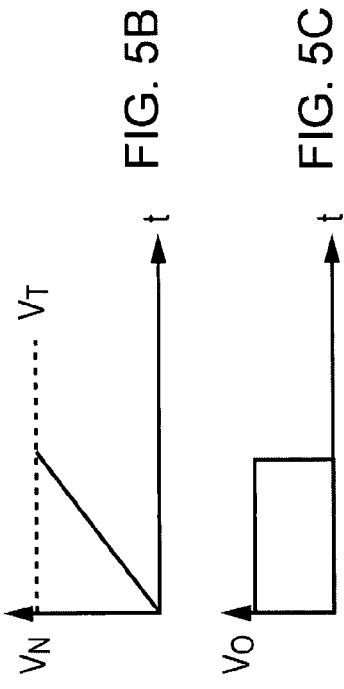
FIG. 5B
FIG. 5C
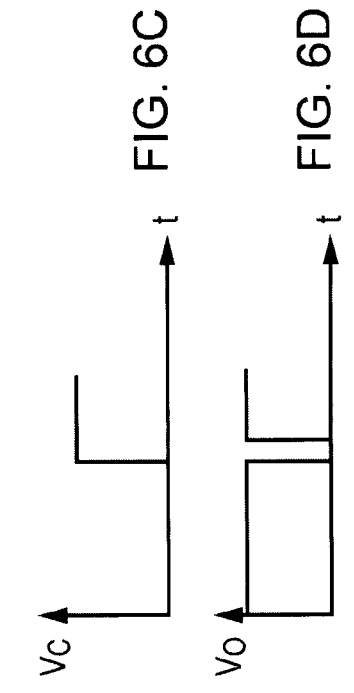
FIG. 6B
FIG. 6C
FIG. 6D
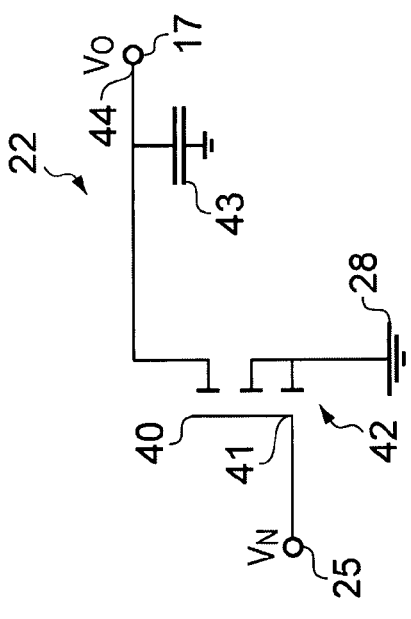
FIG. 5A
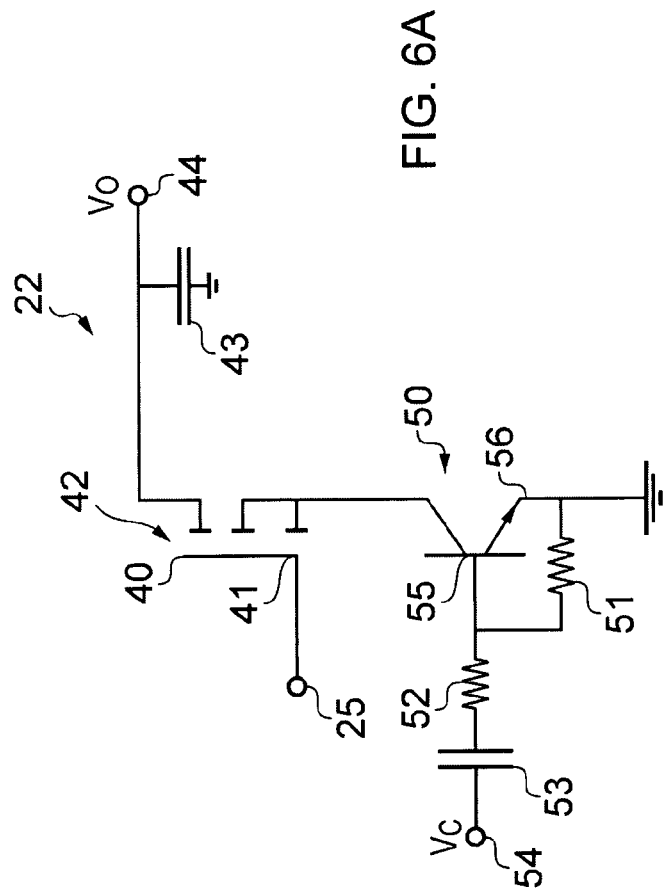
FIG. 6A

US 8,464,039 B2

CIRCUITRY FOR PREVENTING GENERATION OF A HARDWARE RESET OUTPUT SIGNAL BY DISCHARGING A CAPACITOR UNDER THE CONTROL OF A CONTROL SIGNAL GENERATED BY SOFTWARE DURING ITS NORMAL OPERATION

FIELD

Embodiments of the present invention relate to hardware reset circuitry and hardware reset methods. In particular, they relate to automatic hardware reset circuitry suitable for use in apparatuses with simple user interfaces.

BACKGROUND

It would be desirable to reset a processor that is running software when the software behaves abnormally.

In some apparatuses the user interface is very simple. When software behaves abnormally, it may appear to a user that the apparatus has failed and the user may return that apparatus to an after sales service department as they do not know/remember how to activate the manual reset.

It would therefore be desirable to enable automatic reset of the processor when the software behaves abnormally.

BRIEF DESCRIPTION OF VARIOUS EMBODIMENTS

According to various, but not necessarily all, embodiments of the invention there is provided hardware reset circuitry comprising: user interface circuitry having at least a first state and a second state and configured, when in the first state, to prevent generation of a hardware reset output signal.

According to various, but not necessarily all, embodiments of the invention there is provided a method comprising: permanently enabling a hardware process that advances over time from a first state to a second state that enables a hardware reset; intermittently forcing a reset of the hardware process to the first state while software is operational.

According to various, but not necessarily all, embodiments of the invention there is provided hardware reset circuitry comprising: control circuitry configured to respond to receipt of a control signal generated by software during its normal operation, by temporarily preventing the generation of a hardware reset output signal.

According to various, but not necessarily all, embodiments of the invention there is provided an apparatus comprising: a node; a capacitor connected to the node; at least one light emitting diode circuitry connected to draw current from the capacitor during light emission from the at least one light emitting diode circuitry; a power source connected to charge the capacitor; wherein software when functioning normally operates the light emitting diode circuitry draining the capacitor and preventing a voltage at the node triggering a hardware reset.

According to various, but not necessarily all, embodiments of the invention there is provided an apparatus comprising: a processor; circuitry configured as a default to reset of the processor; and functional circuitry having at least a first state and a second state and configured, when in the first state, to override the default of the circuitry and to prevent the circuitry resetting the processor.

According to various, but not necessarily all, embodiments of the invention there is provided an apparatus comprising: reset means for performing a hardware reset; and means for changing state to perform a function other than a reset function wherein said change of state additionally prevents the reset means performing the hardware reset.

BRIEF DESCRIPTION OF THE DRAWINGS

For a better understanding of various examples of embodiments of the present invention reference will now be made by way of example only to the accompanying drawings in which:

FIG. 5A schematically illustrates an example of an output circuit configured to generate a hardware reset signal;

FIGS. 5B and 5C illustrate respectively a time varying voltage at an input node, and the time varying voltage at an output node;

FIG. 6A schematically illustrates an example of an output circuit configured to generate a hardware reset signal;

FIGS. 6B, 6C and 6D illustrate respectively a time varying voltage at a first input node for controlling a field effect transistor, a time varying voltage at a second input node for controlling a bipolar transistor and a time varying voltage at an output node;

DETAILED DESCRIPTION OF VARIOUS EMBODIMENTS

Figure 1:
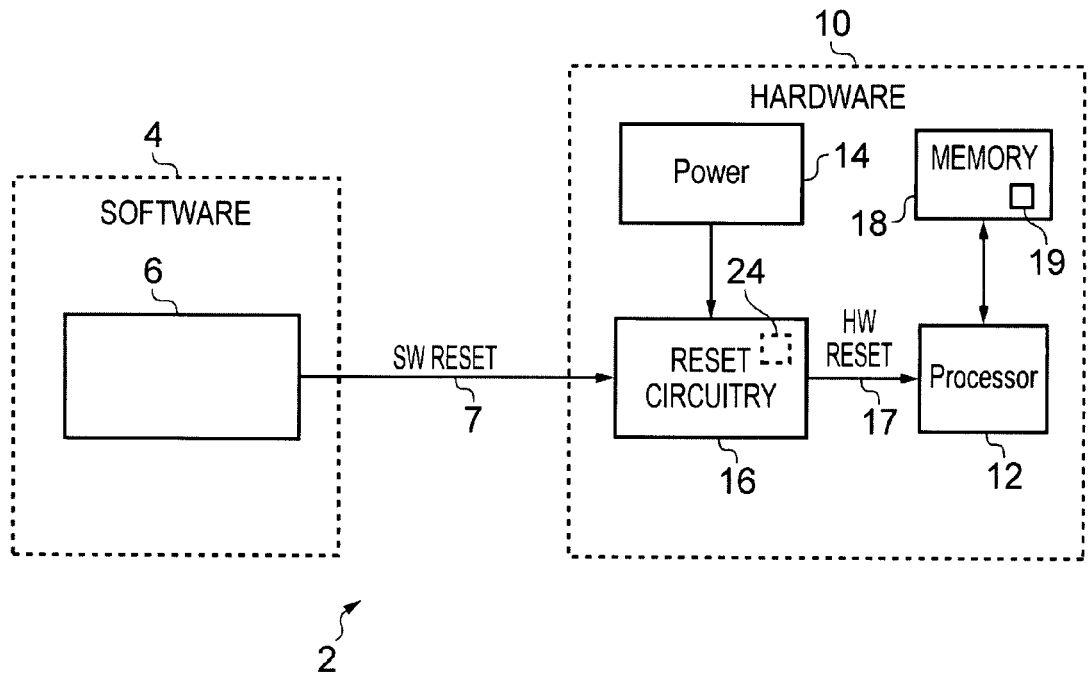
FIG. 1 schematically illustrates functional blocks of an apparatus including a software block and a hardware block.

FIG. 1 schematically illustrates functional blocks of an exemplary apparatus 2. The functional blocks include a software block 4 and a hardware block 10. It should be appreciated that only components referred to in the following description are illustrated and that the hardware block 10 may comprise additional circuitry that is not illustrated.

The hardware block 10 represents the functionality of the hardware circuitry of the apparatus 2. The hardware block 10 may comprise a processor 12, power circuitry 14 and reset circuitry 16. The processor 12 may operate in conjunction with a memory 18 from which it can read and to which it can write.

The processor 12 may operate as a central processing unit of the apparatus 2. The processor 12 may run computer code 19 that enables the software block 4. The computer code 19 may be stored in the memory 18.

The power circuitry 14 may for example comprise a battery or other power source or an interface for receiving power from an external source such as a mains power adapter jack.

The reset circuitry 16 may be powered by the power circuitry 14. The reset circuitry 16 may be configured to receive a software reset control signal 7 from the software block 4. The hardware reset circuitry 16 may be configured to provide a hardware reset signal 17 to the processor 12 to reset the processor 12. The hardware reset signal 17 may for example cause the processor 12 to terminate on-going processes and to re-start by performing a boot procedure.

The software block 4 may represent the functionality of a computer operating system which enables software processes 6 to be performed by the apparatus 2. For example, the software block may be enabled by computer code 19 that is stored in the memory 18 and run by the processor 12. This functionality is provided by computer code that is run by the processor 12 which is part of the hardware block 10. At least some of the enabled software processes may be performed by a software module 6 that generates software reset control signals 7 for the purpose of controlling functional circuitry, such as user interface circuitry, in the hardware block 10.

The hardware reset circuitry 16 may be configured to automatically try and reset the processor 12 as a default, with the software reset control signal 7 overriding this default and preventing reset of the processor 12.

In one exemplary embodiment the software reset control signal 7 may be intermittently generated. The software module 6 may be specifically coded to generate the control signal 7 intermittently either periodically with a period T or non-periodically but with a maximum interval T between successive generations of the control signal 7. In this exemplary embodiment, the hardware reset circuitry 16 may have trigger circuitry 24 that automatically generates a trigger event as default. As an example, the trigger circuitry 24 may change, by default, from a base level to a threshold level. When the threshold level is reached a trigger event occurs and the hardware reset circuitry 16 generates the hardware reset output signal 17. The control signal 7 resets the trigger circuitry 24 to the base level temporarily preventing the trigger event as it takes an interval of time X (X>T) for a change from the base level to the threshold level to occur. Therefore, while the software block 4 is operating normally generation of the control signal 7 occurs intermittently preventing generation of the hardware reset output signal 17. However, when the software block 4 is operating abnormally generation of the control signal 7 may not occur. The trigger circuitry 24 then changes towards the threshold level and, at the trigger event, it generates the hardware reset output signal 17 which resets the processor 12. Thus a delay in receiving the control signal 7 as a consequence of abnormal operation of the software results in resetting the processor 12. Resetting the processor 12 will also reset the software block 4 allowing it to return to normal operation.

The trigger circuitry 24 may, for example, be a timing circuit. It may, for example, comprise a capacitor that stores charge. The capacitor may, for example, be discharged by the control signal 7.

Figure 2:
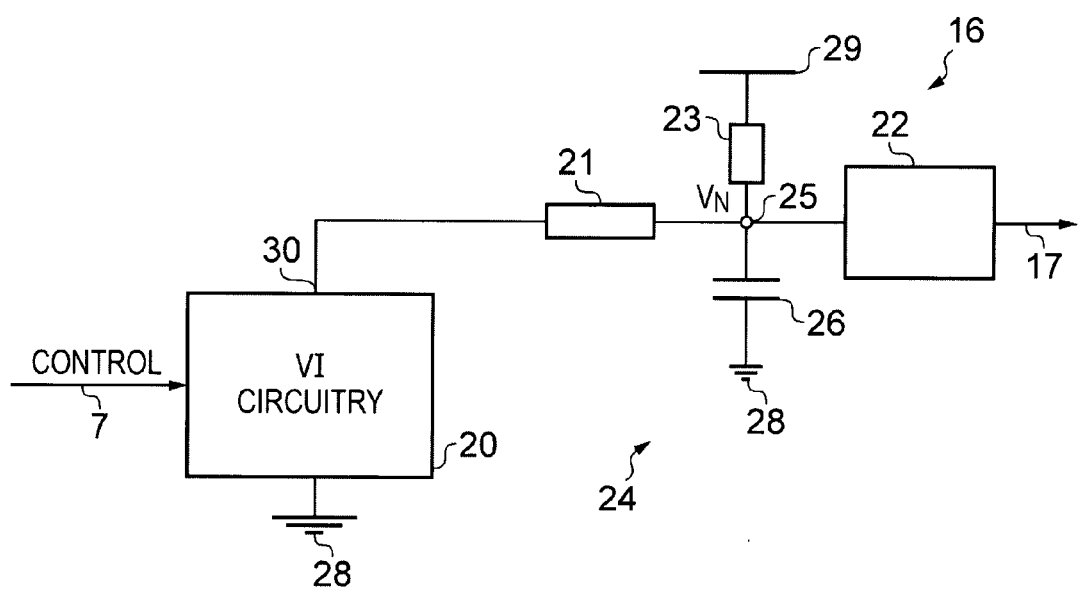
FIG. 2 schematically illustrates one of many examples of hardware reset circuitry.

FIG. 2 schematically illustrates one of many examples of hardware reset circuitry 16. In this example, the trigger circuitry 24 comprises a capacitor 26 configured to automatic charging as a default and for selective discharging by the control signal 7. The capacitor 26 is connected between node 25 and ground 28. The capacitor 26 is charged by voltage 29 which is connected to node 25 via a resistor 23. The capacitor 26 may be connected via a resistor 21 and control circuitry 20 to ground 28. The control circuitry 20 may selectively discharge the capacitor 26 under the control of the software reset control signal 7.

Output circuitry 22 senses the voltage $V_N$ at the node 25. When the voltage $V_N$ exceeds a predetermined threshold $V_T$ the output circuitry 22 generates the hardware reset signal 17.

Figure 3:
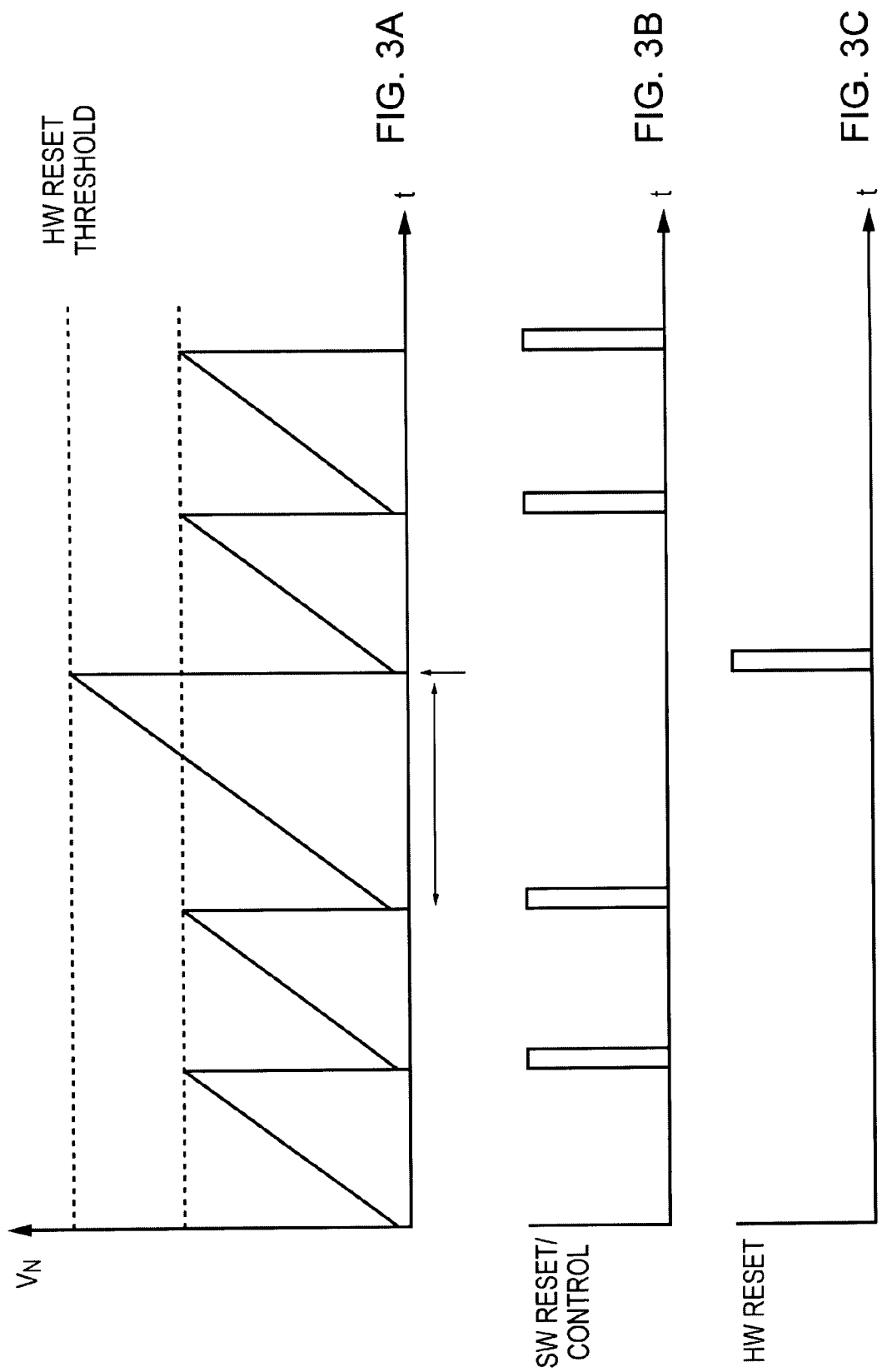
FIGS. 3A, 3B and 3C illustrate respectively a time varying voltage at a node, time varying software reset control signals and a hardware reset signal generated as a consequence of an absence of a software reset control signal.

FIG. 3A illustrates the voltage $V_N$. During normal operation of the software block 4, the voltage $V_N$ accumulates until it is discharged by the software reset control signal 7.

As illustrated in FIG. 3B, the software block 4, when operating normally, may generate the software reset control signal 7 intermittently but often enough to prevent the voltage $V_N$ accumulating to the defined or configured HW reset threshold $V_T$. Thus while the software block 4 is operating normally, the hardware reset signal 17 is not generated.

The software block 4, when operating abnormally, fails to generate the software reset control signal 7. The voltage $V_N$ accumulates to the HW reset threshold $V_T$ and the output circuitry 22 may generate the hardware reset signal 17 as illustrated in FIG. 3C.

Resetting the processor 12 may result in the apparatus 2 being turned-off. Subsequent user action may then required to turn the apparatus on and boot the processor 12. Resetting the processor 12 may result in rebooting the processor 12 without the user being required to turn on the apparatus. After resetting the software block 4 can operate normally generating the software reset control signal 7 often enough to prevent the voltage $V_N$ accumulating to the HW reset threshold $V_T$. Thus while the software block 4 continues to operate normally, the hardware reset signal 17 is not generated.

The control circuitry 20 may have a first state in which control circuitry 20 has current consumption that overrides the default accumulation of charge on the capacitor 26 and drains the capacitor 26 of charge. This prevents generation of a hardware reset output signal 17. The first state may be temporary.

The control circuitry 20 may have a second state in which control circuitry 20 has low or no current consumption and does not override the default accumulation of charge on the capacitor 26.

The control circuitry 20 may be functional circuitry that has a use other than draining charge from the capacitor 26. This other use may, for example, result in current consumption and all or a portion of the consumed current may be provided by discharging the capacitor 26. The software reset control signal 7 generated by the software block 4 may be generated for this other use. The resulting current consumption is usefully re-employed to prevent software reset. The other use may, for example, be a use that is controlled by the software block 4 often enough, during its normal operation, to prevent the voltage $V_N$ accumulating to the threshold $V_T$.

The functional circuitry may, for example, be user interface circuitry such as a display or other optical output device. When the software is operating normally, the user interface consumes 'significant' current (first state). When the software is operating abnormally, the user interface circuitry consumes less or no current (second state) allowing the voltage $V_N$ to accumulate to the HW reset threshold $V_T$.

Figure 4:
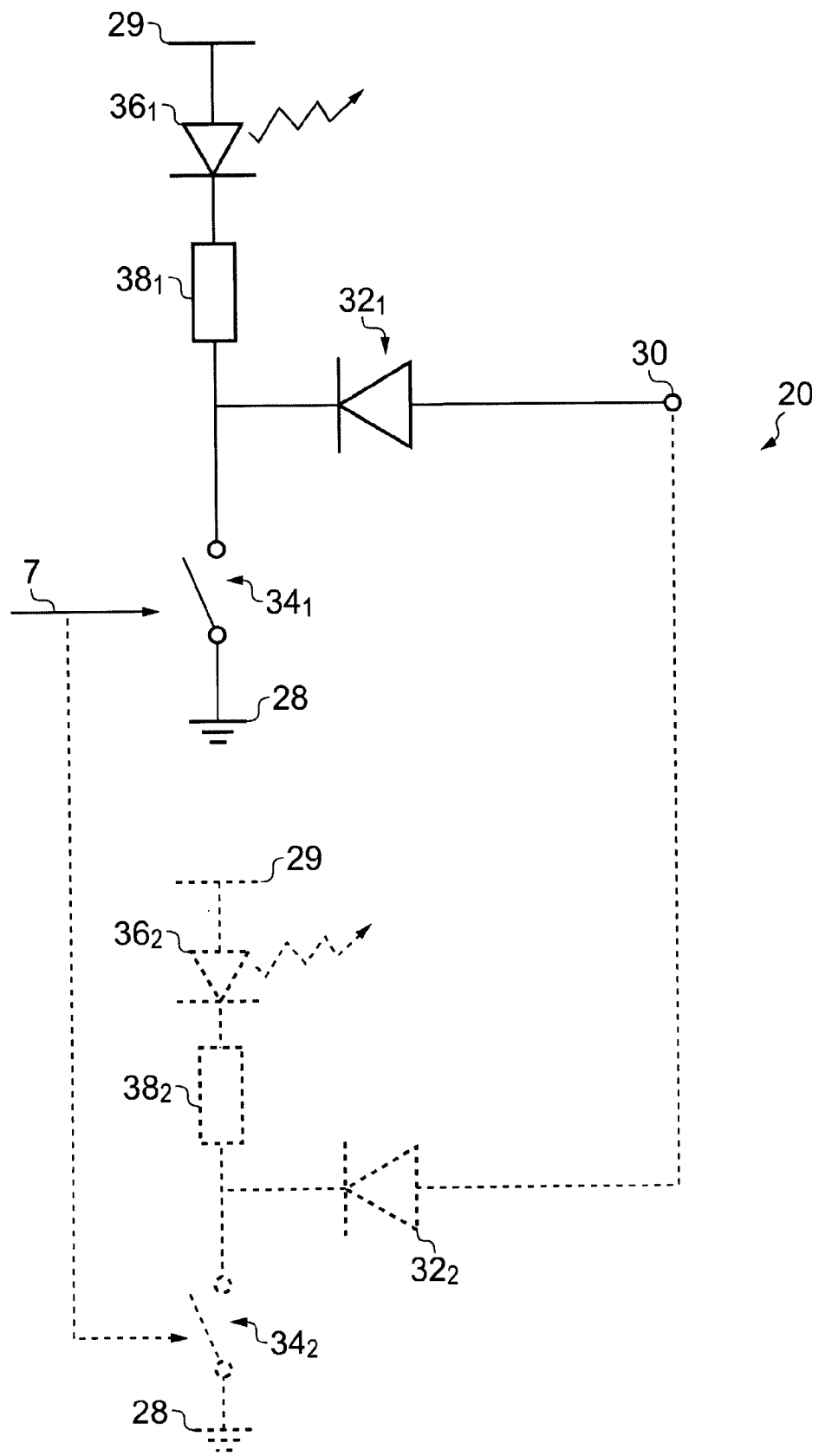
FIG. 4 schematically illustrates an example of user interface circuitry controlled by a software reset control signal to draw current from the node.

FIG. 4 schematically illustrates one example of many possible different implementations of user interface circuitry 20.

The user interface circuitry 20 may be a circuitry for controlling the operation of for example a light emitting diodes (LEDs).

The user interface circuitry 20 may comprise a node 30, which in FIG. 2 would be connected to the resistor 21. The node 30 is connected to ground 28 via a series connected diode 32 and switch 34. The switch 34 is connected via a resistor 38 and light emitting diode 36 to a voltage 29. The switch 34 is actuated by the control signal 7.

When the software block 4 may generate a control signal 7 to switch on the LED 32, the switch 34 is closed temporarily (first state). A voltage may then developed across the LED 36 which switches on and, in addition, an electric current flows from the capacitor 26, via the diode 32 and switch 28, to ground.

If the software block 4 may send control signals 7 that cause the LED to blink, the periodic closing of the switch 34 prevents the capacitor charging to the extent that the voltage $V_N$ reaches the threshold $V_T$. However, if the software block operates abnormally, no control signal 7 is received, the LED are not activated (second state) and the voltage $V_N$ accumulates to the threshold $V_T$.

The user interface circuitry 20 may have additional series connected LED and switch combinations which are connected in parallel with the original series connected LED and switch combination. In this implementation, different control signals 7 may be provided for different LEDs.

FIGS. 5A and 6A illustrate examples of output circuitry 22. Although two examples are illustrated, other implementations are possible. In FIG. 5A the output circuitry 22 automatically generates the hardware reset signal 17. In FIG. 6A the output circuitry 22 semi-automatically generates the hardware reset signal 17.

In FIG. 5A the exemplary output circuitry 22 senses the voltage $V_N$ at the node 25. When the voltage $V_N$ exceeds a predetermined threshold $V_T$ the output circuitry 22 automatically generates the hardware reset signal 17.

The output circuitry 22 may comprise a field effect transistor (FET) 40. A gate 41 of the transistor 40 may be connected to the node 25. A channel 42 of the transistor 40 is connected in electrical series between ground 38 and an output node 44 which provides the hardware reset signal 17.

Referring to FIGS. 5B and 5C, as the voltage $V_N$ at the node 25 rises, it exceeds the threshold voltage $V_T$ of the transistor 40 switching the transistor 40 on and making the channel 42 conductive. A capacitor 43 connected in parallel to the transistor 40 is discharged through the conductive channel 42 and the voltage at the output node 44 drops providing the hardware reset signal 17.

In FIG. 6A a further exemplary output circuitry 22 similar to that described with reference to FIG. 5A is illustrated. However, this output circuitry 22 additionally may comprise a bipolar transistor 50. The bipolar may be connected between the FET 40 and the ground 28. The current path through the bipolar transistor 50 from collector to emitter may be in electrical series with the current path through the channel 42 of the FET 40 towards ground 28.

Therefore if there is to be a current path to ground that discharges the capacitor 43, then both the FET 40 and the bipolar transistor 50 must be switched on. Switching on the FET 40 may be a necessary but it is not a sufficient condition for generation of the hardware reset signal 17. Switching on the bipolar transistor 50 may be an additional necessary condition for the generation the hardware reset signal 17.

The base 55 of the bipolar transistor 50 is connected via a resistor 51 to the emitter 56. A node connected to the base 55 and the resistor 51 is connected to an additional resistor 52. The additional resistor 52 is connected in series with a capacitor 53. The capacitor 53 is connected in series with an input node 54.

When the voltage $V_N$ exceeds the predetermined threshold $V_T$ and the voltage $V_C$ at the node 54 increase sharply, the voltage at the base 55 increases switching on the bipolar transistor 50. A current path through the FET 40 and bipolar transistor 50 drains the capacitor 43 generating the hardware reset signal 17. As the voltage at the base 55 drops the bipolar transistor 50 switches off allowing the capacitor 43 to recharge.

The node 54 may, for example, be a node connected to a battery charger interface. The voltage $V_C$ at the node 54 increases sharply when an external power source is attached to the battery charger interface to charge a battery. The external power source might be a dedicated charger or any other type of device or apparatus that is able to charge a battery. For example a mobile terminal, mobile computer, an external battery pack, a solar charger or the like.

Figure 7:
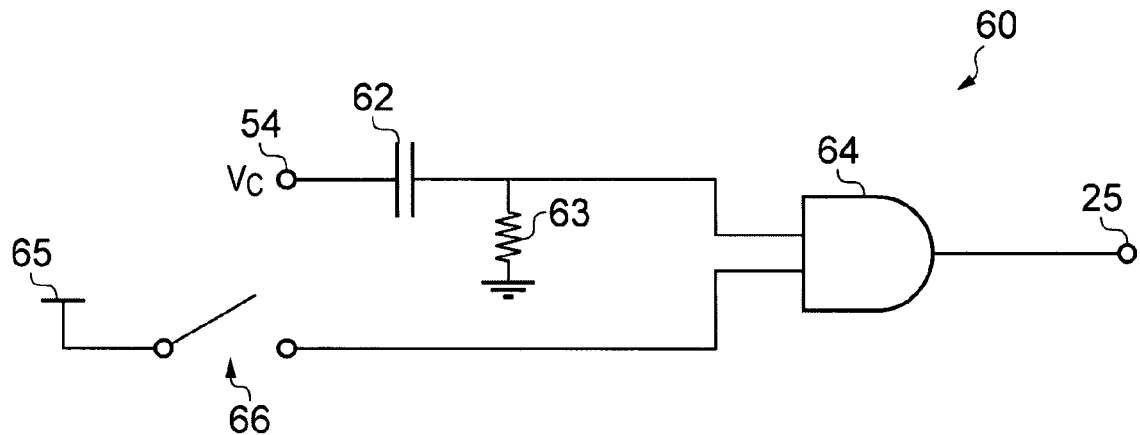
FIG. 7 schematically illustrates a manual override circuit that forcibly controls the voltage at a node.

If for any reason when the software block 4 operates abnormally the voltage $V_N$ does not increase and exceed the predetermined threshold $V_T$ it may be useful to have a circuit, such as a manual override circuit 60 that forces the voltage at the node 25 above the predetermined threshold $V_T$. There are many examples of manual override circuit 60 and one example is illustrates in FIG. 7.

The exemplary manual override circuit 60 comprises a logic AND gate 64. An output of the logic AND gate 64 is connected to the node 25.

A first input of the AND gate 64 may be connected to ground through a resistor 63 and connected to an input node 54 through a capacitor 62. The node 54 may, for example, be a node connected to a battery charger interface. A voltage $V_C$ at the node 54 increase sharply when a charger is attached to charge a battery and creates a HIGH signal at the first input of the AND gate 64.

A second input of the AND gate 24 may be connected via a manually operated switch 66 to a voltage 65. When the switch 66 is closed by a user, a HIGH signal is provided at the second input of the AND gate 64.

Therefore if the charger is attached and the switch 66 is simultaneously actuated, the output of the AND gate goes HIGH. This HIGH output exceeds the predetermined threshold $V_T$.

The manually operated switch 66 may be used for other purposes as well such as a switch in a user interface.

In another implementation of the manual override circuit, the node 25 may be connected via a manually operated switch 66 to a voltage 65. This may be any suitable voltage.

The manually operated switch may be an electronic switch that is operated by an electronic signal. In one example, the electronic signal may be generated via a user interface option of the apparatus and not necessarily by a dedicated button.

Figure 8:
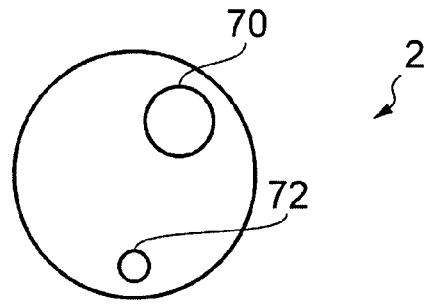
FIG. 8 schematically illustrates the apparatus implemented as a headset such as a wireless headset.

FIG. 8 schematically illustrates an exemplary apparatus 2 implemented as a headset such as a wireless headset. In this example, the headset is a Bluetooth headset.

The headset is small and is typically mounted on a person. As a consequence the headset 2 has a very limited user interface. It typically has one or two buttons 70 and a charger interface 72 for the attachment of a charger for charging an internal battery (not illustrated). In this implementation, the charger interface may be connected to node 54 and the button 70 may operate as switch 66.

The apparatus might be any kind of mobile device or a part of such a device like for example mobile terminal, mobile phone, accessory, peripheral device, portable music player, portable video player or a picture frame. The apparatus might also include an inbuilt power source like for example a battery that can not be easy removed by a user or the apparatus might not have any dedicated user input like a button for triggering a reset.

Figure 9:
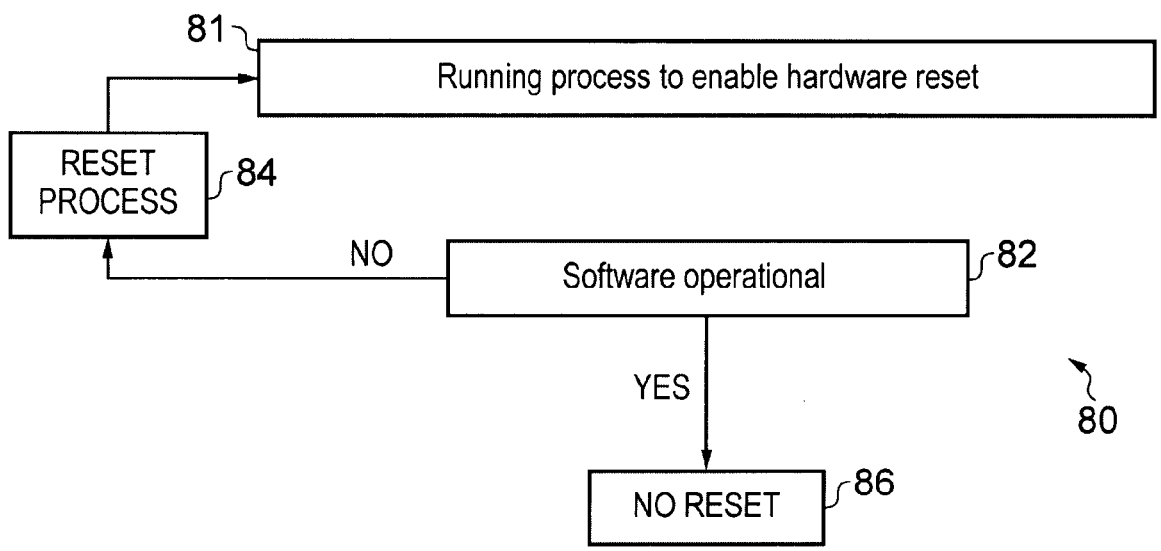
FIG. 9 schematically illustrates a hardware reset method that may be performed by the apparatus.

FIG. 9 schematically illustrates a method 80 that may be performed by an apparatus 2. Block 81 permanently enables a hardware process that advances over time from a first state to a second state that enables a hardware reset. Block 82 intermittently resets 84 the hardware process to the first state while the software is operational and disables 86 resetting of the hardware process while the software is non-operational.

In the Figures and accompanying description, various components are described as 'connected'. The term 'connect' should be understood to encompass not only direct physical connection of the components but also operative coupling between the components in which any number or combination of intervening elements can exist (including no intervening elements) between the components.

The hardware circuitry may be part of a module such as a chipset. As used here 'module' refers to a unit or apparatus that excludes certain parts/components that would be added by an end manufacturer or a user.

The blocks illustrated in FIG. 9 may represent steps in a method and/or sections of code in the computer program. References to computer program, instructions, code etc. should be understood to encompass software for a programmable processor or firmware such as, for example, the programmable content of a hardware device whether instructions for a processor, or configuration settings for a fixed-function device, gate array or programmable logic device etc. The computer program may arrive at the apparatus via any suitable delivery mechanism. The delivery mechanism may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program.

The illustration of a particular order to the blocks does not necessarily imply that there is a required or preferred order for the blocks and the order and arrangement of the blocks may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. Hardware reset circuitry comprising:
   user interface circuitry having at least
   a first state and
   a second state and
   configured, when in the first state, to prevent generation of a hardware reset output signal, and when in the second state, to not prevent generation of the hardware reset output signal,
   wherein the user interface circuitry comprising at least one light emitting diode is configured to indicate to a user whether the user interface circuitry is in the first state or the second state,
   a capacitor configured to charge automatically and configured to discharge during the first state via a discharging path under the control of a control signal generated by software during its normal operation, wherein the at least one light emitting diode is connected to the discharging path of the capacitor to prevent discharging of the capacitor through the light emitting diode.

2. Hardware reset circuitry as claimed in claim 1, wherein the user interface comprises at least one optical output device, at least one light emitting diode or at least one display.

3. Hardware reset circuitry as claimed in claim 1, wherein the user interface circuitry is configured, when in the first state to override default generation of the hardware reset output signal and is configured, when in the second state, to not override automatic generation of a hardware reset output signal.

4. Hardware reset circuitry as claimed in claim 1, wherein the first state is a state in which the user interface circuitry is active and the second state is a state in which the user interface circuitry is inactive.

5. Hardware reset circuitry as claimed in claim 1, wherein the first state is a state which is entered under software control and the second state is a state which is entered in the absence of software control.

6. Hardware reset circuitry as claimed in claim 1, wherein the first state has higher current consumption than the second state and wherein the user interface circuitry is configured to respond to receipt of a control signal generated by software during its normal operation, by temporarily entering the first state and preventing the generation of the hardware reset output signal by consuming current.

7. Hardware reset circuitry as claimed in claim 1 comprising:
   output circuitry configured to generate a hardware reset output signal in response to a trigger event; and
   trigger circuitry configured to generate a trigger event,
   wherein the user interface circuitry is configured, when in the first state, to prevent temporarily generation of the trigger event, wherein the user interface circuitry is configured to respond to receipt of a control signal generated by software during its normal operation, by temporarily entering the first state and wherein, a delay in receiving a control signal as a consequence of abnormal operation of the software results in generation of the trigger event and wherein the trigger circuitry comprises a capacitor configured to charge automatically and configured to discharge under the control of software, the user interface circuitry being configured to drain current from the capacitor.

8. A method comprising:
   permanently enabling a hardware process that advances over time from a first state to a second state that enables a hardware reset;
   intermittently forcing a reset of the hardware process to the first state while software is operational and disabling forced reset of the hardware process while software is non-operational; and
   using a user interface circuitry comprising at least one light emitting diode to indicate to a user whether the hardware process is in the first state or the second state,
   wherein the user interface circuitry comprises a capacitor configured to charge automatically and configured to discharge during the first state via a discharging path under the control of a control signal generated by software during its normal operation, wherein the at least one light emitting diode is connected to the discharging path of the capacitor to prevent discharging of the capacitor through the light emitting diode.

9. A non-transitory computer-readable medium encoded with instructions which, when executed by a computer, and when used to configure an apparatus enable the apparatus to perform:

permanently enabling a hardware process that advances over time from a first state to a second state that enables a hardware reset;

intermittently forcing a reset of the hardware process to the first state while software is operational and disabling forced reset of the hardware process while software is non-operational; and using a user interface circuitry comprising at least one light emitting diode to indicate to a user whether the hardware process is in the first state or the second state, wherein the user interface circuitry comprises a capacitor configured to charge automatically and configured to discharge during the first state via a discharging path under the control of a control signal generated by software during its normal operation, wherein the at least one light emitting diode is connected to the discharging path of the capacitor to prevent discharging of the capacitor through the light emitting diode.

10. Hardware reset circuitry comprising:

control circuitry configured to respond to receipt of a control signal generated by software during its normal operation, by temporarily preventing the generation of a hardware reset output signal, wherein the control circuitry is a user interface circuitry controlled by the control signal and wherein the user interface circuitry comprises at least one light emitting diode and is configured to indicate to a user whether the user interface circuitry is in a first state when a control signal is received or in a second state when the control signal is not received, and wherein the user interface circuitry comprises a capacitor configured to charge automatically and configured to discharge during the first state via a discharging path under the control of a control signal generated by software during its normal operation, wherein the at least one light emitting diode is connected to the discharging path of the capacitor to prevent discharging of the capacitor through the light emitting diode.

11. Hardware reset circuitry as claimed in claim 10, wherein the user interface circuitry comprises at least one optical output device, at least one light emitting diode or at least one display.

12. Hardware reset circuitry as claimed in claim 10, wherein the control circuitry responds to receipt of the control signal by increasing its current consumption.

13. Hardware reset circuitry as claimed in claim 12, comprising a capacitor wherein the increase in current consumption discharges the capacitor.

14. Hardware reset circuitry as claimed in claim 10, wherein the control circuitry is configured to respond to receipt of the control signal by overriding default generation of the hardware reset output signal and wherein the control circuitry is configured in the absence of receipt of the control signal to not override automatic generation of the hardware reset output signal.

15. Hardware reset circuitry as claimed in claim 10, wherein the control circuitry, in the absence of receipt of the control signal, is configured in response to specific user action to not prevent automatic generation of the hardware reset output signal.

16. Hardware reset circuitry as claimed in claim 15, wherein the specific user action comprises attaching an external power source.

17. Hardware reset circuitry as claimed in claim 10, wherein the control signal is intermittently generated by the software during its normal operation.

18. Hardware reset circuitry as claimed in claim 10, wherein, a delay in receiving the control signal as a consequence of abnormal operation of the software results in generation of the hardware reset output signal.

19. Hardware reset circuitry as claimed in claim 10 comprising:

output circuitry configured to generate a hardware reset output signal in response to a trigger event;

trigger circuitry configured to generate a trigger event, wherein the control circuitry is configured to respond to receipt of the control signal by preventing temporarily generation of the trigger event wherein the trigger circuitry comprises a capacitor configured to charge automatically and configured to be discharged in response to receipt of the control signal wherein the user interface circuitry is configured to drain current from the capacitor.

20. Apparatus comprising:

a node;

a capacitor connected to the node;

at least one light emitting diode circuitry configured to indicate whether current is drawn from the capacitor during light emission from the at least one light emitting diode circuitry;

a power source connected to charge the capacitor;

wherein software when functioning normally operates the light emitting diode circuitry draining the capacitor and preventing a voltage at the node triggering a hardware reset, wherein the capacitor is configured to charge automatically and configured to discharge via a discharging path under the control of a control signal generated by software during its normal operation, wherein the light emitting diode is connected to the discharging path of the capacitor to prevent discharging of the capacitor through the light emitting diode.

21. An apparatus comprising:

a processor;

circuitry configured as a default to reset of the processor;

functional circuitry having at least a first state and a second state and configured, when in the first state, to override the default of the circuitry and to prevent the circuitry resetting the processor, wherein the circuitry comprises at least one light emitting diode and is configured to indicate to a user whether the circuitry is in the first state or the second state, and a capacitor configured to charge automatically and configured to discharge during the first state via a discharging path under the control of a control signal generated by software during its normal operation, wherein the at least one light emitting diode is connected to the discharging path of the capacitor to prevent discharging of the capacitor through the light emitting diode.

* * * * *